United States Patent
Lam et al.

(10) Patent No.: US 11,122,071 B2
(45) Date of Patent: Sep. 14, 2021

(54) VISIBILITY AND SCANNING OF A VARIETY OF ENTITIES

(71) Applicant: FORESCOUT TECHNOLOGIES, INC., San Jose, CA (US)

(72) Inventors: Anderson Lam, Fremont, CA (US); Sharad Singh, San Jose, CA (US); Mihael Sudakovitch, Seattle, WA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 197 days.

(21) Appl. No.: 16/023,553

(22) Filed: Jun. 29, 2018

(65) Prior Publication Data

US 2020/0007570 A1 Jan. 2, 2020

(51) Int. Cl.
H04L 29/06 (2006.01)

(52) U.S. Cl.
CPC .......... *H04L 63/1433* (2013.01); *H04L 63/10* (2013.01); *H04L 63/20* (2013.01)

(58) Field of Classification Search
CPC ..... H04L 63/1433; H04L 63/10; H04L 63/20; H04L 63/302; H04L 63/306; H04L 63/308; H04L 63/1408; H04L 63/102; G06F 21/55

See application file for complete search history.

(56) References Cited

U.S. PATENT DOCUMENTS

| | | | | |
|---|---|---|---|---|
| 7,969,950 | B2* | 6/2011 | Iyer | H04W 24/00 370/338 |
| 7,971,232 | B2* | 6/2011 | Hasbun | G06F 21/105 380/232 |
| 8,627,447 | B1* | 1/2014 | Chickering | H04L 63/0263 726/11 |
| 9,087,189 | B1* | 7/2015 | Koeten | H04L 41/0226 |
| 9,104,837 | B1* | 8/2015 | Khajuria | G06F 21/00 |
| 9,282,005 | B1* | 3/2016 | Yehuda | H04L 41/065 |
| 9,717,006 | B2* | 7/2017 | Haugen | H04W 12/08 |
| 9,893,940 | B1* | 2/2018 | Chawla | G06F 16/84 |
| 10,419,931 | B1* | 9/2019 | Sohail | H04L 63/1425 |
| 10,691,796 | B1* | 6/2020 | Stolte | G06F 21/554 |
| 10,812,518 | B1* | 10/2020 | Belton, Jr. | G06F 9/44 |
| 10,841,321 | B1* | 11/2020 | Athavle | G06F 16/24575 |
| 2003/0023711 | A1* | 1/2003 | Parmar | H04L 41/0893 709/223 |

(Continued)

OTHER PUBLICATIONS

International Search Report and Written Opinion for International Application No. PCT/US2019/036104, dated Sep. 8, 2019.

(Continued)

*Primary Examiner* — Michael Pyzocha
(74) *Attorney, Agent, or Firm* — Womble Bond Dickinson (US) LLP

(57) ABSTRACT

Systems, methods, and related technologies for entity visibility are described. In certain aspects, information associated with a type of entity is accessed and a network is scanned for a plurality of entities. One or more entities are selected from plurality of entities based on the type of entity. Properties associated with the one or more selected entities are accessed. The information associated with the one or more selected entities and the one or more properties associated with the selected one or more entities are stored.

17 Claims, 7 Drawing Sheets

(56) References Cited

U.S. PATENT DOCUMENTS

| | | | |
|---|---|---|---|
| 2005/0071457 A1* | 3/2005 | Yang-Huffman | H04L 41/0893 709/224 |
| 2005/0097199 A1* | 5/2005 | Woodard | H04L 67/125 709/223 |
| 2006/0112427 A1* | 5/2006 | Shahbazi | G06F 21/606 726/16 |
| 2007/0157313 A1* | 7/2007 | Denton | G06F 21/6218 726/22 |
| 2008/0055100 A1* | 3/2008 | Mathur | H04L 41/06 340/679 |
| 2008/0215665 A1* | 9/2008 | Appleby | H04L 67/04 709/202 |
| 2008/0256618 A1* | 10/2008 | Bansal | H04L 63/102 726/11 |
| 2009/0077631 A1* | 3/2009 | Keohane | H04L 63/0876 726/3 |
| 2009/0300707 A1* | 12/2009 | Garimella | H04L 63/0823 726/1 |
| 2010/0071035 A1* | 3/2010 | Budko | H04L 63/08 726/4 |
| 2010/0125911 A1* | 5/2010 | Bhaskaran | G06Q 10/10 726/23 |
| 2010/0262957 A1* | 10/2010 | Uppunda | G06F 8/61 717/170 |
| 2010/0296496 A1* | 11/2010 | Sinha | H04W 12/12 370/338 |
| 2012/0102543 A1* | 4/2012 | Kohli | H04L 63/20 726/1 |
| 2012/0129503 A1* | 5/2012 | Lindeman | H04L 67/34 455/414.1 |
| 2012/0297059 A1* | 11/2012 | Brass | G06F 11/3006 709/224 |
| 2013/0024552 A1* | 1/2013 | Libert | H04L 61/6077 709/220 |
| 2013/0219496 A1* | 8/2013 | Nie | H04L 63/1433 726/22 |
| 2013/0268652 A1* | 10/2013 | Hugard, IV | H04W 4/38 709/224 |
| 2013/0347116 A1* | 12/2013 | Flores | H04L 63/1433 726/25 |
| 2014/0068030 A1* | 3/2014 | Chambers | H04L 41/0809 709/220 |
| 2015/0117322 A1* | 4/2015 | McGrath | H04W 72/00 370/329 |
| 2015/0150072 A1* | 5/2015 | Doctor | H04L 63/105 726/1 |
| 2015/0156079 A1* | 6/2015 | Satterlee | H04L 41/0893 709/223 |
| 2015/0381662 A1* | 12/2015 | Nair | H04L 63/205 726/1 |
| 2016/0072846 A1 | 3/2016 | Doctor | |
| 2016/0088026 A1* | 3/2016 | Mohamad Abdul | G06F 21/30 726/1 |
| 2016/0099969 A1* | 4/2016 | Angus | H04L 63/0876 713/158 |
| 2016/0234689 A1* | 8/2016 | Stan | H04L 63/1416 |
| 2017/0244761 A1* | 8/2017 | Baukes | H04L 41/0873 |
| 2017/0324733 A1* | 11/2017 | Howry | H04L 63/105 |
| 2017/0331839 A1* | 11/2017 | Park | G06F 21/6245 |
| 2018/0159751 A1 | 6/2018 | Zhang | |
| 2018/0176254 A1* | 6/2018 | Lam | H04L 63/1408 |
| 2018/0268072 A1* | 9/2018 | Rathod | G06F 16/9535 |
| 2018/0367396 A1* | 12/2018 | Kompella | H04L 41/0859 |
| 2018/0367548 A1* | 12/2018 | Stokes, III | H04L 63/145 |
| 2019/0132337 A1* | 5/2019 | Park | G06F 21/554 |
| 2019/0268219 A1* | 8/2019 | Haapanen | H04L 41/0893 |
| 2019/0349356 A1* | 11/2019 | McElwee | H04L 63/1441 |
| 2019/0356568 A1* | 11/2019 | Dongre | H04L 43/065 |
| 2019/0394106 A1* | 12/2019 | Correnti | H04W 4/02 |

OTHER PUBLICATIONS

Transmittal of International Preliminary Report on Patentability dated Jan. 7, 2021, for International Application No. PCT/US2019/036104, filed Jun. 7, 2019, pp. 8.

* cited by examiner

VISIBILITY AND SCANNING OF A VARIETY OF ENTITIES

TECHNICAL FIELD

Aspects and implementations of the present disclosure relate to monitoring of information of a network, and more specifically, visibility of a variety of entities among one or more network segments of a communication network.

BACKGROUND

As technology advances, the number and variety of devices that are connected to communications networks are rapidly increasing. Each device may have its own respective vulnerabilities which may leave the network open to compromise or other risks. Scanning of each device on a network can be useful for monitoring or securing a communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
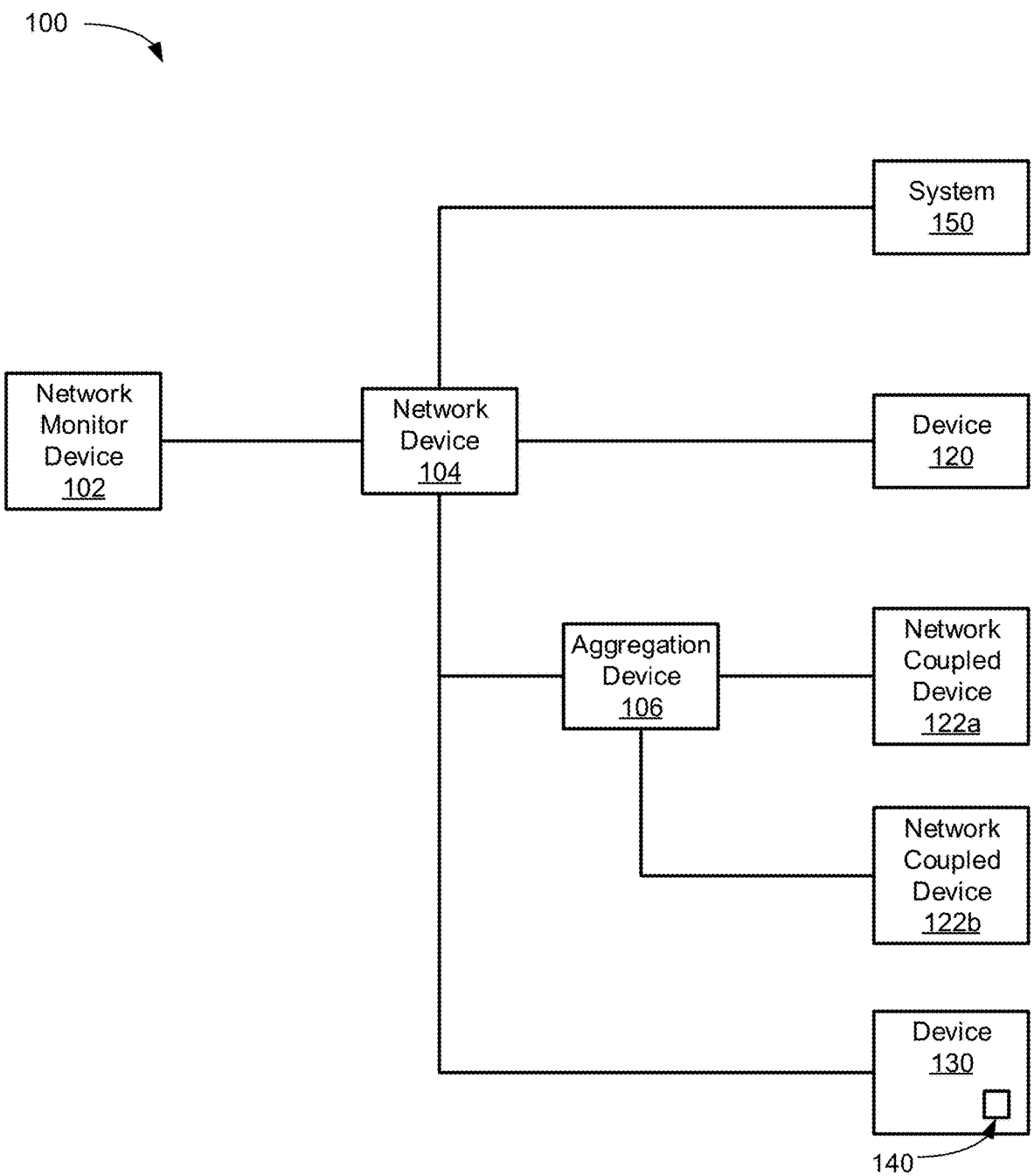
FIG. 1 depicts an illustrative communication network in accordance with one implementation of the present disclosure.

Aspects and implementations of the present disclosure are directed to visibility into a variety of entities (or resources) on a network. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which enable the ongoing scanning of networks for a variety of entities so that the entities can be monitored for vulnerabilities, threats, and actions taken (e.g., based on a policy).

Current network access control (NAC) products provide endpoint-centered visibility, control, and compliance. This is usually based on collecting information with respect to each endpoint (e.g., various "host properties" or pieces of information about an endpoint), and enforcing compliance by examining this information and comparing it to a set of rules.

Certain network resources such as account metadata cannot be easily bundled with or identified with an endpoint. Another example is cloud storage that is associated with a cloud account but not associated with an endpoint. Moreover, much of the network configurations and network events are not easily associated with one or more endpoints or visible based on endpoint monitoring. The tracking of resources on a network based on IP address or MAC addresses leaves a variety of resources not visible.

Examples of these resources that are not tracked under IP/MAC address centric models include access control management settings, account configurations, network firewalls configurations, data storage configurations, traffic anomalies, attack detections, etc. Integrating visibility and enforcement of such elements would provide a holistic solution to network visibility, control, and compliance. Control management settings can relate to an account or user in an account and can include the properties of the resources that a user of the account can access. Account configurations can include user accessible resources and limits on a user account. For example, information technology (IT) department accounts may restricted from accessing billing department resources. Network firewall configurations can include the configuration of a firewall (e.g., IP tables of the firewall) which can then be monitored for changes. Data storage configurations can include cloud storage resources. Traffic anomalies includes indicators of compromise (IOCs) which may have an associated severity level (e.g., high, medium, and low) or a properties like being a file based IOC or a network traffic IOC (e.g., where an infected device is attempting to communicate with a nefarious server).

Entities are objects or resources (or their properties or characteristics) associated with a network (or systems thereof) that can be tracked and monitored. Each entity is an object or a resource, among other things noted below, other than an endpoint or device itself, where a device would be tracked with an IP address or with a MAC address under an IP/MAC address centric model. Entities include network resources that are not endpoints (e.g., accounts, cloud storage, etc.). Entities include network associated resources beyond those that can be tracked with an IP address or MAC address. Entities can include accounts (e.g., user accounts, cloud accounts, etc.), network configurations (e.g., firewall configuration, router configurations, switch configurations, security device configurations, etc.), indicators of compromise (IOCs), storage (e.g., local or cloud storage resources), access control management settings, account configurations, data storage configurations, traffic anomalies, attack detections, etc. The tracking of entities allow visibility and monitoring beyond monitoring and tracking of just endpoints or devices (e.g., based on IP address or MAC address). In other words, entities as used herein refers to non-endpoints resources or resource portions associated with a network. An endpoint may include one or more entities, e.g., accounts, network configurations, IOCs, etc. Embodiments are able to present (e.g., display, list, etc.) and control entities that are not IP based or endpoint based. Entities include resource that are not tracked under IP address or MAC address based models or systems. Entities thus are IP/MAC address independent.

An example of an entity is an account for a local (e.g., Active Directory™) or external product or service, e.g., cloud accounts (e.g., AWS, Azure). The account entity further includes "account properties" (e.g., similar to "host properties"), such as name, type, domain, permissions, segment, license, ongoing billing/cost, alias, module, total endpoints, regions, virtual private clouds (VPCs), security groups (SGs), etc. Another example entity is storage, e.g., cloud based storage, like S3 buckets of Amazon web services available for Amazon, Inc. of Seattle, Wash., U.S., with storage properties including total vs. available size, permissions and access control, encryption, etc.

Embodiments are able to monitor these above mentioned resources or entities for security, compliance, and possible remediation, as described herein. Embodiments may apply policies to specific IOCs or based on the severity of the IOC (e.g., a policy could apply to high severity IOCs).

Embodiments are able to present (e.g., display, list, etc.) and control entities that are not IP based or endpoint based. Entities can be presented and policies can be applied to the entities. For example, if an account is not in compliance, e.g., the password has not been changed in 6 months, a policy may notify the user via email, SMS, or disable or pause the account. Policies that may be applied to endpoints may thus be applied to entities, as described herein. Embodiments can include a network access control (NAC) product or device.

In some embodiments, a graphical user interface (GUI) may show IP addresses or endpoints and show entities associated therewith. For example, endpoints may be shown in a hierarchy which when expanded (e.g., via clicking a plus sign) shows entities such as accounts, cloud storage resources, etc., that are associated with each endpoint where relevant. This would be helpful in a case where a key logger was found on a device, then each of the accounts that were logged into from that device could be viewed and the accounts limited, disabled, or have the passwords changed (from a different device). Each account could also be limited from logging in from outside the network or from another device on the network. The one or more policies that may apply to an endpoint may also be displayed.

Based on monitoring various entities, embodiments allow definition of compliance policies. The compliance policies may be similar to what is available for endpoints (e.g., FIG. 4), providing visibility and automatic remediation control (e.g., limit permissions from a non-compliant account if found).

Embodiments provide for tracking entities of a network beyond those based on an IP address or MAC address. This provides unparalleled visibility and control of network resources and entities which is disjoint from the network endpoint centered view. In other words, resources or entities on a network that are not viewable or manageable under an IP address or MAC address model are visible and manageable with embodiments. Embodiments further provide for treating misconfigurations, non-compliant entities, etc., on objects or resources such as accounts, storage, and others.

Embodiments further allow support of other types of monitoring beyond network monitoring including billing and cost monitoring or configuration compliancy. For example, a compromise or security breach may be identified based on a cloud account that has been assigned no work but is running up (significant) costs (e.g., based on CPU or compute usage) above a specified threshold. As another example, accounts may be scanned to check that their access permissions are in compliance with a policy. Further, Vulnerability Assessment (VA) products can be enhanced by providing compliance information on the configuration of the automatic scans (e.g., how often scans are being launched, which scan templates are used, etc.).

Accordingly, described herein in various implementations are systems, methods, techniques, and related technologies, which enable device visibility, scanning, and remediation. As described herein, various techniques can be used to scan networks for a variety of entities beyond those of an IP/MAC address centric model.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including monitoring a variety of entities (e.g., accounts, network configurations, IOCs, storage, etc.) on a network, checking for compliance, and performing actions based on the compliance status thereof, as described herein. For example, network monitor device 102 may monitor a cloud account to ensure that the cost or expenditure associated with the cloud account is below a threshold and if the threshold is exceeded, the account is disabled. Network monitor device 102 may further display (e.g., FIGS. 4-5) information associated with the entities, provide a list of options for each entity, and allow configuration of one or more policies to apply to one or more entities.

Network monitor device 102 may further perform a variety of functions including identification, classification, and taking one or more remediation actions (e.g., changing network access of an account, disabling an account, modifying a configuration of a network device, changing access permissions on a cloud storage resource, sending an email or short message service (SMS) alert, etc.) based on the results of a scan. For example, if the permissions on a cloud storage resource are not in compliance, the permissions may be changed by network monitor device 102 to be in compliance (e.g., changing from public or Internet accessible to local only).

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor communication using a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of devices and entities by network monitor device 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for devices that are communicatively coupled to a network via a NAT device (e.g., firewall, router, etc.) dynamically, periodically, or a combination thereof.

Information from one or more external or 3$^{rd}$ party systems (e.g., system 150) may further be used to determine properties or information associated with one or more entities. For example, a vulnerability assessment (VA) system may be queried to access information about an entity (e.g., particular IOCs associated with an account or cloud storage resource). External or 3$^{rd}$ party systems may also be used to perform a scan or a check on an entity to determine compliance or gather information associated with an entity.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140 (e.g., account information). While network monitor device 102 may be able to receive information from agent 140, installation or execution of agent 140 on many devices may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130, network coupled devices 122*a-b*, and entities on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including accounts, operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used to monitor devices and control network access of one or more devices. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user or account information of a device being monitored in real-time which can then be used to determine a risk level of the device.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
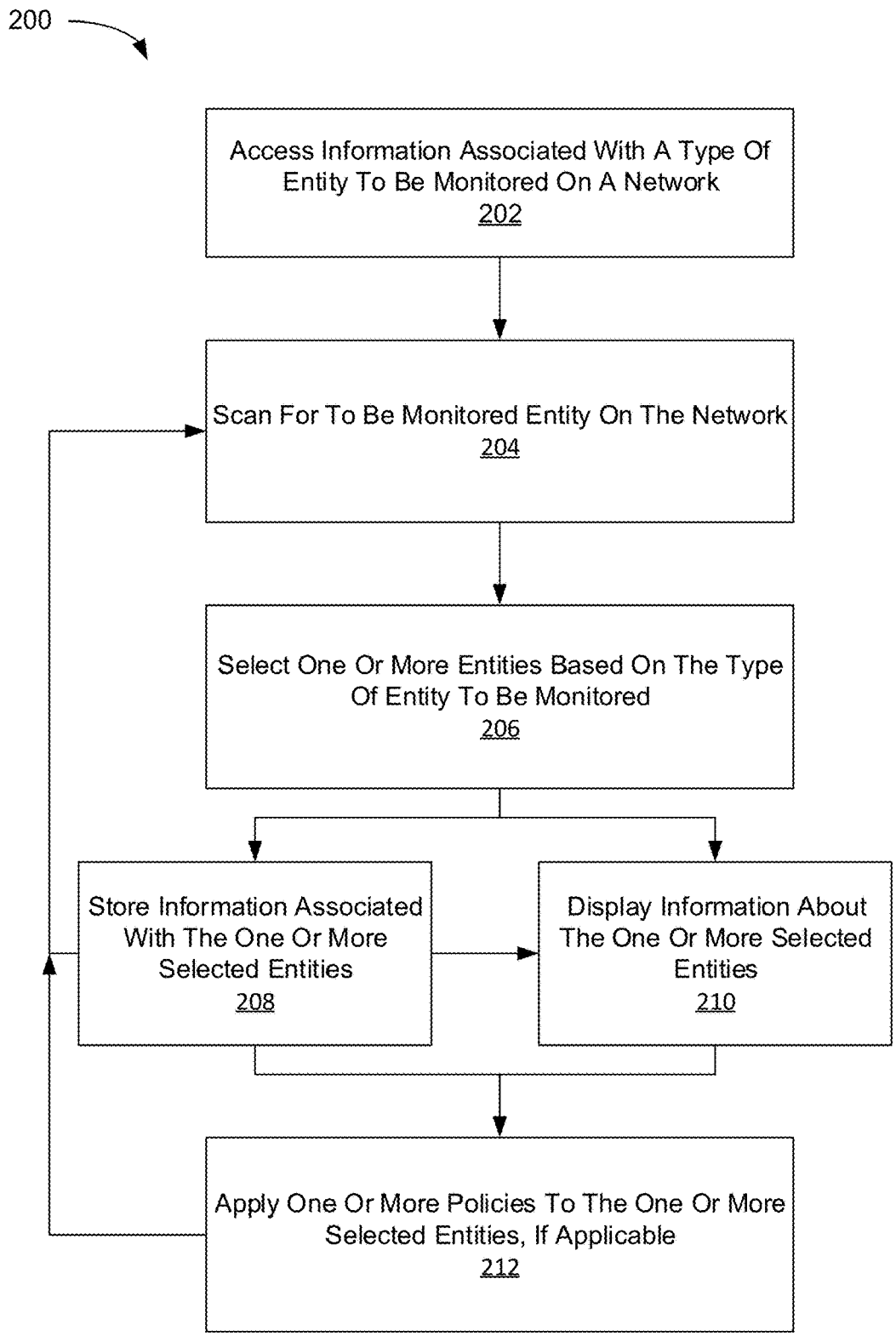
FIG. 2 depicts a flow diagram of aspects of a method for polling a variety of entities in accordance with one implementation of the present disclosure.
Figure 3:
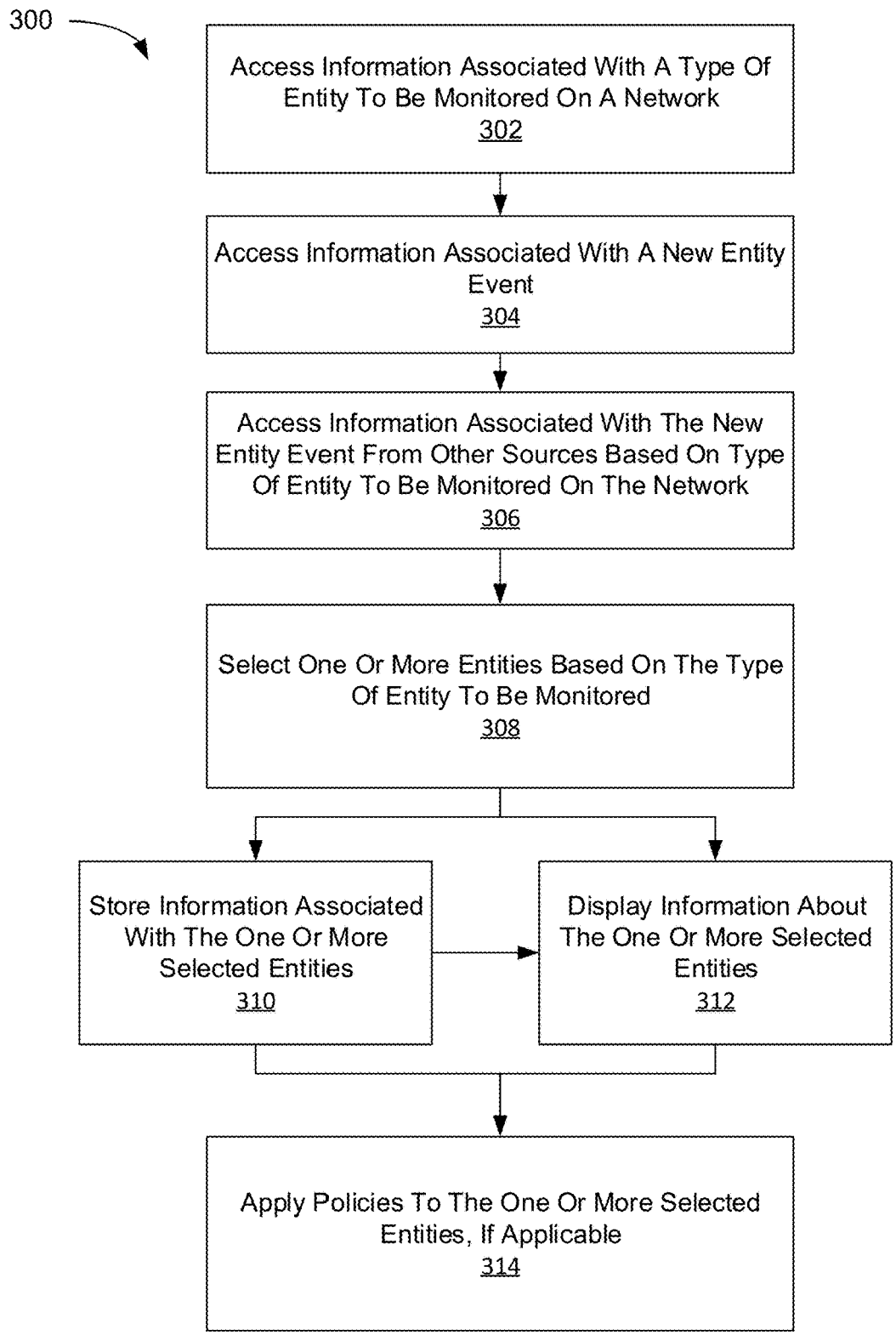
FIG. 3 depicts a flow diagram of aspects of a method for real-time monitoring of a variety of entities in accordance with one implementation of the present disclosure.

With reference to FIGS. 2-3, flowcharts 200-300 illustrate example functions used by various embodiments. Although specific function blocks ("blocks") are disclosed in flowcharts 200-300, such blocks are examples. That is, embodiments are well suited to performing various other blocks or variations of the blocks recited in flowcharts 200-300. It is appreciated that the blocks in flowcharts 200-300 may be performed in an order different than presented, and that not all of the blocks in flowcharts 200-300 may be performed.

FIG. 2 depicts a flow diagram of aspects of a method for polling a variety of entities in accordance with one implementation of the present disclosure. Flowchart 200 shows a process for polling for a variety of entities, processing the information, and applying a one or more policies, if applicable. Various portions of flowchart 200 may be performed by different components (e.g., components of system 600) of a device (e.g., network monitor device 102).

At block 202, information associated with a type of entity to be monitored on a network is accessed. The type of entity may be selected by a user, be part of a policy, or part of a default information collection configuration of a device (e.g., network monitor device 102). The type of entity may include, but is not limited to, account, storage (e.g., cloud storage), IOC, or network configuration (e.g., firewall or router network configuration), as described herein.

In some embodiments, an IP range for which the type of entity will be scanned for is configured (e.g., by a user, for instance, via a graphical user interface (GUI)). In various embodiments, the type of entity to be monitored may be user configured along with providing relevant information. For example, a user may be prompted to enter one or more account names and passwords in order for cloud resources (e.g., accounts, storage, etc.) to be scanned in a particular IP range of the cloud, policies applied, or a combination thereof.

At block 204, the type of entity to be monitored is scanned for on the network. The accessed type of entity may be scanned for from multiple sources including, but not limited to, clouds, account servers (e.g., Active Directory™ or Lightweight Directory Access Protocol (LDAP)), network devices (e.g., switches, firewalls, routers, wireless access points, etc.), virtualization systems (e.g., vSphere™ from VMware of Palo Alto, Calif.) or virtual machines, etc. In some embodiments, the accessing of entity information is performed before, in parallel, or after getting endpoint or device information.

In various embodiments, the frequency or period of time between scans may be user configured (e.g., every minute, every hour, or real-time). In some embodiments, the entity information may be sent from a device to the system or device performing portions of flowchart 200 in response to a query.

At block 206, one or more entities are selected based on the type of entity to be monitored. The entities matching the type of entity are filtered or selected from the scan results. For example, a user may configure for selection of only active-directory accounts of the account type entity.

At block 208, information associated with the one more selected entities is stored. The information may be stored for use later (e.g., for tracking, analytics, etc.), for displaying (e.g., block 210), for use with a policy (e.g., block 212).

Figure 4:
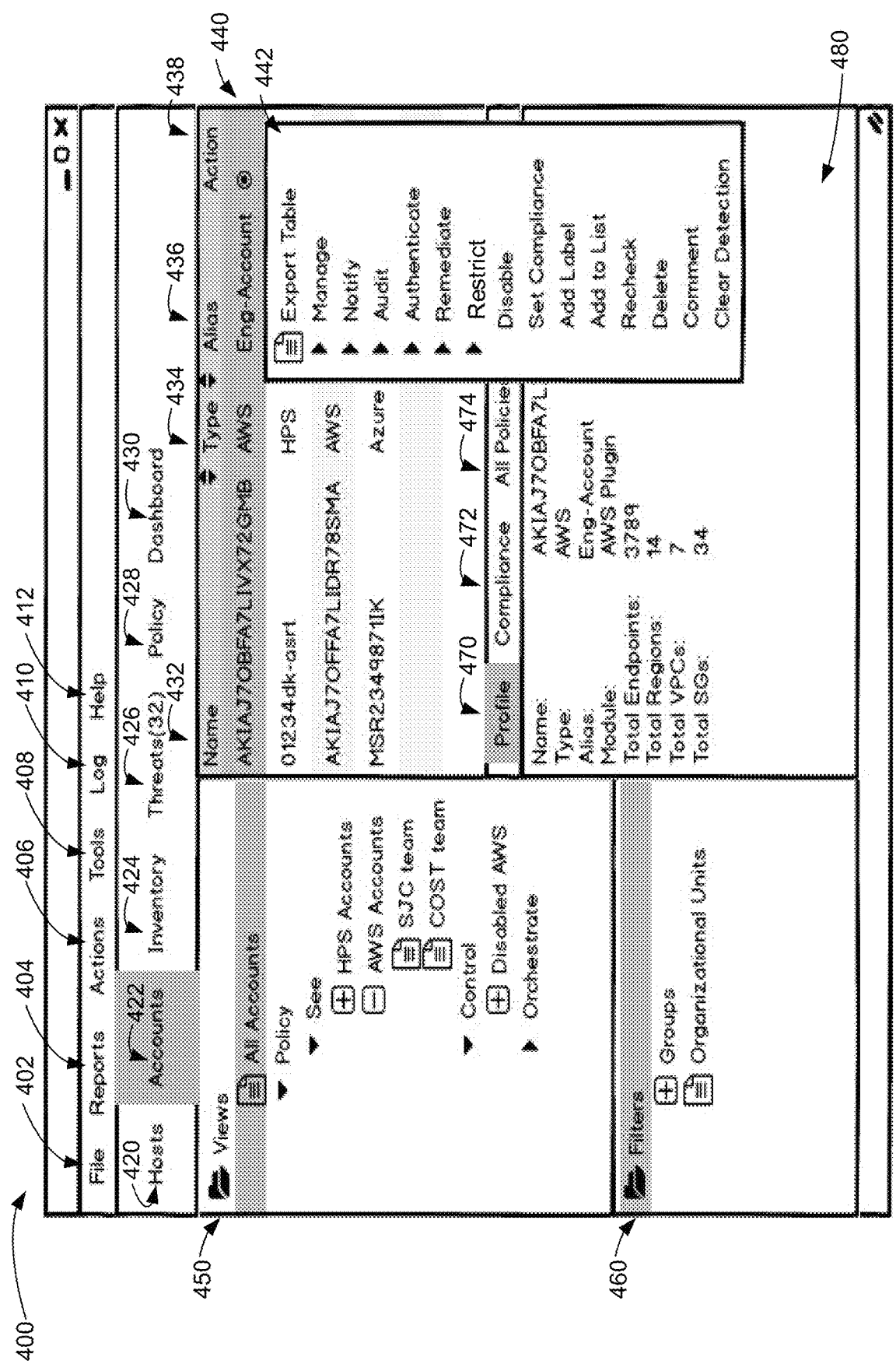
FIG. 4 depicts a diagram of aspects of an example graphical user interface for viewing a variety of entities in accordance with one implementation of the present disclosure.

At block 210, information about the one or more selected entities is displayed. The information may be displayed as shown in FIG. 4. For example, each cloud account and associated properties (e.g., number of virtual machines, security information, cost, etc.) may be displayed.

At block 212, one or more policies are applied to the one or more selected entities, if applicable. Based on the criteria of a policy (e.g., as configured via GUI 500), a policy may be applied to the one or more selected entities. For example, if a policy specifies that any account that has been inactive for six months be disabled, the application of the policy may disable any accounts that have been for more than six months.

In some embodiments, a policy may cause polling (e.g., block 204) for additional entity information. For example, polling may be done for basic virtualization systems information and entities (e.g., cloud storage) and then a policy may poll for additional virtualization system information (e.g., to determine a type of remediation action to take after checking permissions).

FIG. 3 depicts a flow diagram of aspects of a method for real-time monitoring of a variety of entities in accordance with one implementation of the present disclosure. Flowchart 300 shows a process for real-time monitoring of entities (e.g., based on events), processing information associated with the entities, and applying a one or more policies, if applicable. Various portions of flowchart 300 may be performed by different components (e.g., components of system 600) of a device (e.g., network monitor device 102).

At block 302, information associated with a type of entity to be monitored on a network is accessed. The type of entity may be selected by a user, be part of a policy, or part of a default information collection configuration of a device (e.g., network monitor device 102). The type of entity may include, but is not limited to, account, storage (e.g., cloud storage), IOC, or network configuration (e.g., firewall or router network configuration), as described herein.

At block 304, information associated with a new entity event is accessed. This can occur after a new entity is detected or notification associated with the new entity is received or stored. For example, when a new user account is created or a new firewall (e.g., an endpoint or device having an entity, for instance a firewall configuration or firewall account) is added to a network, each can be a new entity event. The new entity even may be accessed in real-time. For example, lambda of Amazon web services can send a notification that new account has been created. In some embodiments, the new entity event may be an entity that was just used (e.g., cloud storage that had a file added) or an entity that has been inactive (e.g., or dormant for a specified period of time) and is now active (e.g., an account).

At block 306, information associated with the new entity event from other sources based on the type of entity to be monitored on the network is optionally accessed. For example, when a new account is detected, the account service or domain server or service may be queried for additional properties or information about the account (e.g., last login, creation date, permissions, etc.).

At block 308, one or more entities are selected based on the type of entity to be monitored. The entities, including the entity of the new entity event, matching the access type of entity are filtered or selected from the scan results. For example, a user may configure for selection of only active-directory accounts of the account type entity event and a new account entity that is an active-directory account will be included based on the selection.

At block 310, information associated with the one more selected entities is stored. The information may be stored for use later (e.g., for tracking, analytics, etc.), for displaying (e.g., block 312), for use with a policy (e.g., block 314).

At block 312, information about the one or more selected entities is displayed. The information is may be displayed as shown in FIG. 4 and may include the new entity of the new entity event. For example, each cloud account and associated properties (e.g., number of virtual machines, security information, cost, etc.) may be displayed.

At block 314, one or more policies are applied to the one or more selected entities, if applicable. Based on the criteria of a policy (e.g., as configured via GUI 500), a policy may be applied to the one or more selected entities. For example, if a policy specifies that any account have particular permissions and the new entity is an account with non-compliant permissions, a notification can be sent and if the non-compliance is not resolved within 24 hours the account may be disabled, restricted, or the like.

In some embodiments, a policy may cause polling (e.g., block 306) for additional entity information. For example, polling may be done for new cloud storage and then a policy may poll for permissions, which may then be checked for compliance.

FIG. 4 depicts a diagram of aspects of an example graphical user interface for viewing a variety of entities in accordance with one implementation of the present disclosure. Example graphical user interface (GUI) 400 is configured for viewing and manage a variety of entities of a network (e.g., computer network 100). Example GUI 400 includes menus 402-412, tabs 420-430, entity listing area 440, views area 450, filters area 460, and details area 480. It is noted that while example GUI 400 is described with respect to account entities, embodiments support other entities (e.g., storage and IOC entities). GUI 400 may be rendered or displayed by a device (e.g., network monitor device 102).

Menus 402-412 include file menu 402, reports menu 404, actions menu 406, tools menu 408, log menu 410, and help menu 412. File menu 402 is configured for accessing various file related functions such as saving or opening data files. Reports menu 404 is configured for accessing various reports related to a network (e.g., network 100). Actions menu 406 is configured for accessing various actions that can be taken with respect various endpoints or entities including remediation actions, as described herein. Tools menu 408 is configured for accessing various tools for analyzing or monitoring a network (e.g., network 100). Log menu 410 is configured for accessing logs associated with one or more network devices or entities. Help menu 412 is configured for various help functions to assist a user in using example GUI 400.

Tabs 420-430 include hosts tab 420, accounts tab 422, inventory tab 424, threats tab 426, policy 428, and dashboard 430. Embodiments may support more tabs in example GUI 400 for each type of entity, e.g., storage, IOCs, device configurations (e.g., firewall configuration), etc.

Hosts tab 420 is configured for accessing a list and associated details associated with endpoints or devices on a network. Accounts tab 422 is configured for accessing a list and associated details associated with accounts. Inventory tab 424 is configured for accessing a list and associated details associated with an inventory of devices on a network. Threats tab 426 is configured for accessing a list and associated details associated with threats (e.g., IOCs). Policy tab 428 is configured for accessing an interface for accessing and configuring policies (e.g., FIG. 5). Dashboard 430 is configured for accessing an interface for viewing visualization of data about a network (e.g., including graphs and other informational graphics) including endpoints and entities.

Entity listing area 440 is configured for listing entities and associated details. Entities listing area 440 as shown in example GUI 400, shows a listing of accounts and associated details. Entity listing area 440 includes name column 432, type column 434, alias column 436, and action column 438. Name column 432 lists names of accounts. Type column 434 includes type indicators of each account, e.g., if an account is a cloud account (for instance, Amazon web services (AWS) account, Azure account, or local account (detected by a host property scanner (HPS))). Alias column 436 indicates whether an account is an alias or may include a description of the account (e.g., a department associated with the account). Action column 440 is configured for invoking menu 442 to select one or more actions for an account.

Menu 442 includes options for exporting a table of account ("Export Table"), managing accounts ("Manage"), setting notifications for an account ("Notify"), setting an audit configuration ("Audit"), setting remediation actions ("Remediate"), setting account restrictions ("Restrict"), disabling an account ("Disable"), setting compliance parameters ("Set Compliance"), labeling an account ("Add Label"), adding an account to a list ("Add to List"), rechecking an account ("Recheck"), deleting an account ("Delete"), creating or editing a comment on an account ("Comment"), or clearing detection for an account ("Clear Detection"). In some embodiments, the actions available for an account are similar to those available for an endpoint. In some embodiments, the restrict options allows the viewing of resources an account can access and allowing or limiting the resources, permissions, or a combination thereof that the account can access.

Views area 450 includes a hierarchical display of accounts and allows selection of accounts according to the hierarchy. As shown, views area 450 includes viewing each account and viewing accounts according to see (e.g., visibility), control (e.g., controlling network access), and orchestrate (e.g., sharing information with other systems) policy categories. The control policy area can be used for setting controls for one or more accounts (e.g., with policy that apply the options of menu 442). The orchestrate policy area allows configuration of sharing or exchange of information related to accounts (other entities) with third party or external systems (e.g., system 150). For example, the source of an account, e.g., that an account is a cloud account with a particular cloud service, can be shared. Account information may further be shared with a ticketing system to allow the ticketing system to open a ticket associated with the account. As another example, for cloud storage resources, information about the storage resources may be shared with an anomaly detection tool (e.g., a tool that can analyze the contents of the storage resource and report accordingly). The contents of entity listing area 440 and details area 480 can be updated based on a selection of one or more accounts in views area 450.

Views area 450 may vary depending on the entities involved or selected (e.g., selected based on accounts tab, threats tab, etc.). For example, views area 450 may show IOCs grouped by severity level or show each IOC with the locations of the IOC upon expansion (e.g., via the plus sign icon). Policies may then be configured for the IOCs based on severity (e.g., isolate one or more devices or accounts based on a high severity IOC, send a notification for low, medium, and high severity IOCs, or send a notification when more than a particular number or percentage (e.g., 50%) of devices or accounts on a network have the same IOC).

Filters area 460 allows selection of one or more filters for filtering accounts that are shown. For example, filters area 460 allows filtering accounts according to groups of account ("Groups") and organizational units.

Details area 480 is configured for display of various details about an account (or other entity). In some embodiments, details area 480 includes profile tab 470, compliance tab 472, and all policies tab 474.

Profile tab 470 is configured for displaying a variety of details about an account as shown in example GUI 400. It is appreciated that not all same information types may be shown for each entity. For example, certain information may be shown for an account entity while different information is shown for storage and IOC entities.

Profile tab 470 shows name, type, and alias information as described with respect to entity listing area 440. Profile tab 470 further shows the module associated with the account, e.g., AWS plugin, the total number of endpoints associated with the account, e.g., 3789, the total number of regions, e.g., fourteen geographic regions where virtual machines can be started or spun up, the total number of virtual private cloud or subnets (e.g., a block of IP addresses) associated with the account, e.g., seven, and the total number of security groups or access control lists with can include allow rules (e.g., to limit a virtual machine or VPC from communicating with the outside world) associated with the account, e.g., 34. Profile tab 470 may further show an identifier (ID) (e.g., an ID number), creation date, permissions, last login time, last active time, and charges (e.g., dollar amounts associated with a cloud account, a limit on a dollar amount that the account can incur in cost before the account is stopped, etc.) associated with the account.

In some embodiments, profile tab 470 displays properties of a VPC entities (e.g., when a VPC tab is selected) including an associated cloud account, cloud storage resource, permissions, IP ranges associated with the VPC, whether the VPC has outbound internet access, costs associated with the VPC, etc.

In various embodiments, profile tab 470 displays properties of a security group or network security group, firewall, or router configuration including parameters of the configuration, permissions, etc. A policy may apply to the configuration which requires that none of the security groups should have port 22 open.

Compliance tab 472 is configured for displaying compliance settings associated with an account or other entities (according to the entity type selected). All policies tab 474 is configured for show each policy associated with an account or a selected entity type.

It is noted that while an account may be added to an endpoint in an endpoint centric model, some endpoints can belong to different accounts and the endpoints cannot generally be shared but an account can have access to different endpoints.

Embodiments are able to perform policy functions unavailable under an endpoint centric model. Visibility and policies cannot be applied to an account in an endpoint centric system. For example, a policy may require that all of the users under an account must have their passwords changed every six months, such a policy cannot be applied in an endpoint centric system because the accounts are independent of the endpoints. In contrast, a policy that is applied to accounts can be implemented.

Figure 5:
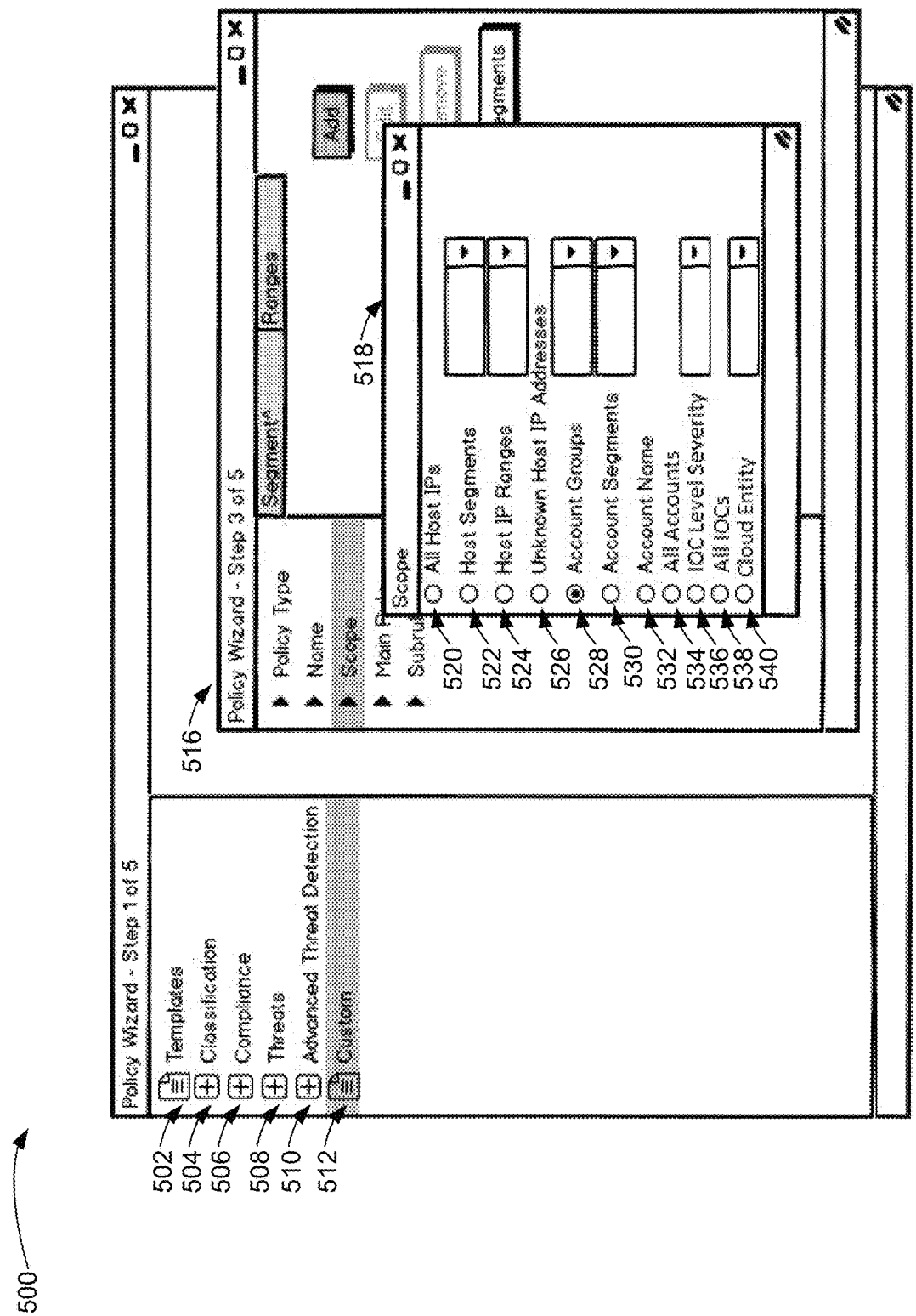
FIG. 5 depicts a diagram of aspects of an example graphical user interface for policy configuration in accordance with one implementation of the present disclosure.

FIG. 5 depicts a diagram of aspects of an example graphical user interface for policy configuration in accordance with one implementation of the present disclosure. Example graphical user interface (GUI) 500 shows a portion of policy wizard that supports configuration of a policy for a variety of entities. In particular, example GUI 500 depicts a scope configuration portion of the policy wizard that supports selecting various entities or entity types to apply a policy thereto. Example GUI 500 allows a user to select among various entities and is not limited to just selection of IP addresses or endpoints. GUI 500 may be rendered or displayed by a device (e.g., network monitor device 102). Example GUI 500 includes policy selection area 514, policy configuration area 516, and scope area 518.

Policy selection area 514 allows for selection of various types of policies (e.g., in a hierarchical format). Policy selection area 514 includes policy templates 502, classification policies 504, compliance policies 506, threats policies 508, advanced threat detection policies 510, and custom policies 512. Policy templates 502 allows for selection of policy templates that may be used for creating a policy. Classification policies 504 allows for selection of classification policies which may then be customized. Compliance policies 506 allows for selection of compliance policies which may then be customized. Threats policies 508 allows for selection of threat based policies which may then be customized. Advanced threat detection policies 510 allow for selection of advanced threat detection policies which may then be customized. Custom policies 512 allows for creation of custom polices and can invoke display of policy configuration area 516. As shown in example GUI 500, custom policies 512 is selected.

Policy configuration area 516 allows for configuring particular parts of a policy including a custom policy. Policy configuration area 516 is configured for allowing setting of a policy type, name of a policy, scope of a policy, main rule(s) of a policy, and sub-rule(s) of a policy.

As shown in example GUI 500, the scope option is selected in policy configuration area 516 and shows segment and ranges columns (which may be displayed as relevant). In some embodiments, selection of the scope option in policy configuration area 516 results in display of scope area 518.

Scope area 518 includes options for selection a scope of entities or endpoints that a policy can be applied. In scope area 518, the type of entity can be selected (e.g., account group), and then the scope that applies to the entity can be selected (e.g., via a dropdown). Scope area 518 includes all host IPs option 520, host segment option 522, host IP ranges option 524, unknown host IP addresses option 526, account groups option 528, account segments option 530, account name option 532, all accounts option 534, IOC level severity option 536, all IOCs option 538, and cloud entity option 540.

All host IPs option 520 is configured for setting the scope of policy to apply to each IP address of a network. Host segment option 522 is configured for selecting a segment of hosts (e.g., via a dropdown) for a policy. Host IP ranges option 524 is configured for selecting an IP range of hosts (e.g., via a dropdown) for a policy. Unknown host IP addresses option 526 is configured for applying a policy to hosts that were not detected with an IP address (e.g., the host MAC address was detected). Account groups option 528 is configured for selecting (e.g., via a dropdown) a group of accounts (e.g., accounts in the accounting group of a company). In some embodiments, an account group (e.g., all accounts group) includes each account of a corporation. Account segments option 530 is configured for selecting a segment (e.g., via a dropdown) of an account (e.g., an IT group could have an IT security segment and a regular IT segment) for which the policy will apply. The use of account segments can allow a segment of an account group to have different permissions than another segment. Account name option 532 is configured for selecting an account name for which to apply the policy. All accounts option 534 is configured for setting the scope of a policy to apply to each account of a network. IOC level severity option 536 is configured for selecting a severity level (e.g., high, medium, or low via a dropdown) which the policy will be applied. All IOCs option 538 is configured for setting the scope of a policy to apply to each IOC (e.g., each IOC observed at any location on the network). Cloud entity option 540 is configured for selecting a cloud entity (e.g., a storage resource, VPC, security group, via a dropdown) that the policy will apply to.

For example, a policy may apply to each account that requires the password of the account to be changed each few months according to a specified time period and the policy further limits access to a sensitive payroll server or payroll cloud service if the password has not been changed within the specified time.

Figure 6:
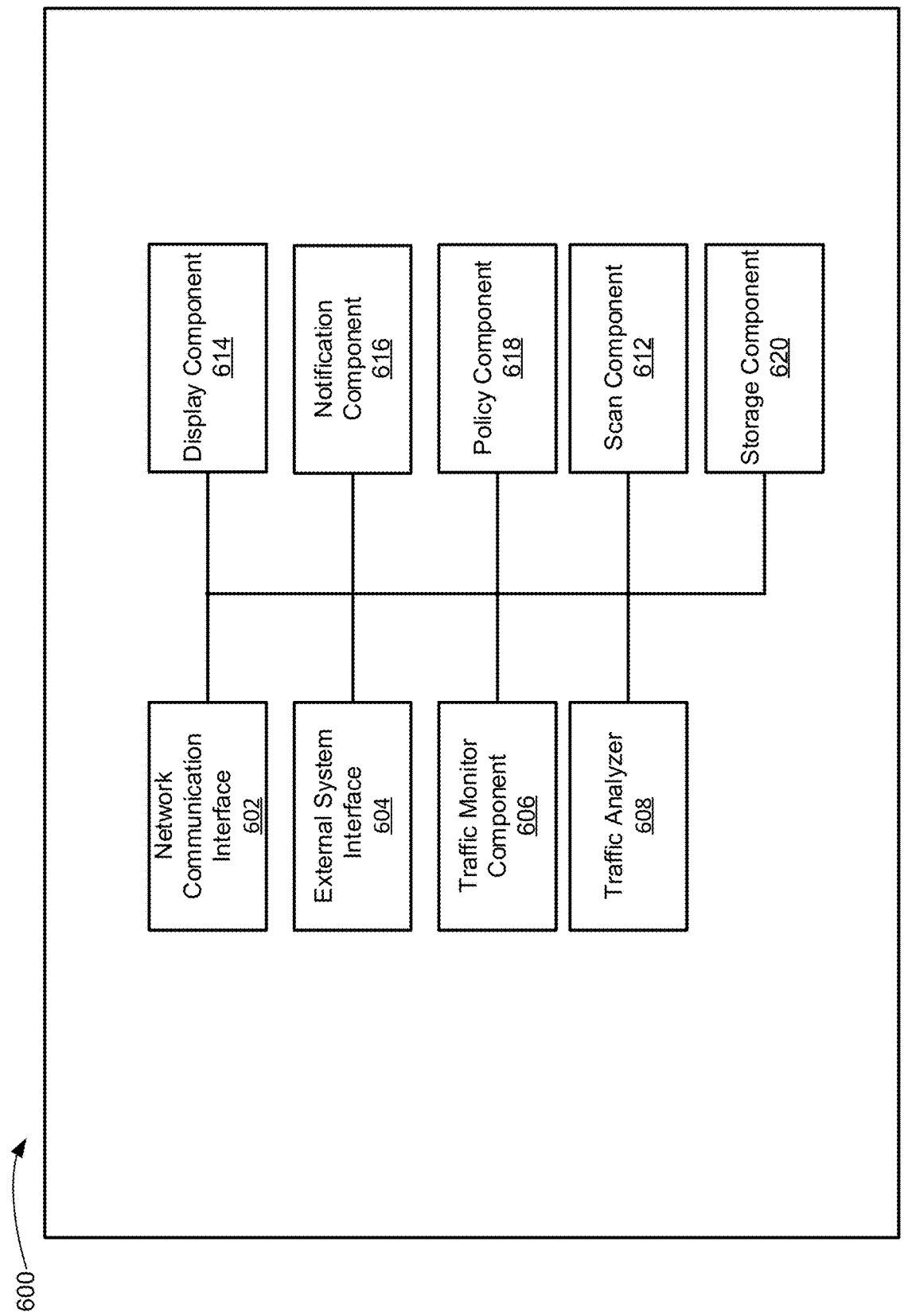
FIG. 6 depicts illustrative components of a system for monitoring of a variety of entities in accordance with one implementation of the present disclosure.

FIG. 6 depicts illustrative components of a system for monitoring of a variety of entities in accordance with one implementation of the present disclosure. FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

FIG. 6 depicts illustrative components of a system for device visibility and scanning in accordance with one implementation of the present disclosure. Example system 600 includes a network communication interface 602, an external system interface 604, a traffic monitor component 606, a traffic analyzer 608, a scan component 612, a display component 614, a notification component 616, and a policy component 618, and a store component 620. The components of system 600 may be part of a computing system or other electronic device (e.g., network monitor device 102) or a virtual machine and be operable to monitor and one or more devices communicatively coupled to a network. For example, the system 600 may further include a memory and a processing device, operatively coupled to the memory, which may perform the functions of or execute the components of system 600. The components of system 600 may access various data associated with one or more entities stored on one or more devices that are local or remote (e.g., one or more cloud systems). It is appreciated that the modular nature of system 600 may allow the components to be independent and allow flexibility to enable or disable individual components or to extend/upgrade components without affecting other components thereby providing scalability and extensibility. System 600 may perform one or more blocks of flow diagrams 200-300.

Communication interface 602 is operable to communicate with one or more devices (e.g., network device 104) coupled to a network that are coupled to system 600 and receive or access information about devices (e.g., properties or information associated with entities, endpoints, etc.) coupled to the network, as described herein. The communication interface 602 may be operable to work with one or more components to initiate the communication with one or more resources to determine entities of a particular type (e.g., accounts or IOCs) that are present on one or more networks, which may include cloud resources (e.g., cloud accounts and storage).

External system interface 604 is operable to communicate with one or more third party, remote, or external systems (e.g., system 150) to access information about one or more entities including one or more entities and information associated with the entities, information about endpoints, or a combination thereof. External system interface 604 may further store the accessed information in a data store. For example, external system interface 604 may access information from a cloud based system thereby enabling system 600 to scan for entities and ensure compliance of entities in the cloud based system. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall for information (e.g., configuration information) of the firewall.

Traffic monitor component 606 is operable to monitor network traffic for entity information (e.g., IOCs) and endpoint information, as described herein. Traffic analyzer 608 is configured to perform analysis of network traffic (e.g., in real-time, with machine learning, etc.) to determine whether an entity (e.g., IOC) or entity associated information (e.g., an attempt to communicate with a nefarious command and control site) is present. Traffic analyzer 608 may have a packet engine operable to access packets of network traffic (e.g., passively) and analyze the network traffic. The traffic analyzer 608 may be configured to perform active or passive traffic analysis or a combination thereof. The traffic analyzer 608 may further be able to access traffic analysis data associated with a device being monitored, e.g., where the traffic analysis is performed by a third party or external system.

Scan component 612 is configured to scan for entities and entity associated information (e.g., properties, for instance, account creation and last login dates), as described herein. The scanning component may scan multiple systems throughout local and remote networks to gather the entity information, including a list of entities, e.g., accounts, network configurations, IOCs. Scan component 612 may perform one or more blocks of flowcharts 200-300. Scan component 612 may further scan for endpoint information, as described herein.

Display component 614 is configured to optionally render or display a graphical user interface (e.g., FIG. 4) or other interface (e.g., command line interface) for depicting various entities and associated information, as described herein. In some embodiments, display component 612 may display a GUI for configuring a policy (e.g., FIG. 5) that applies to one or more entities, endpoints, or a combination thereof.

Notification component 616 is operable to initiate one or more notifications based on the results of policies applied to one or more entities, endpoints, or a combination thereof, as described herein. The notification may be any of a variety of notifications, e.g., IT ticket, email, SMS, a HTTP notification, etc., as described herein.

Policy component 618 is operable for initiating or triggering one or more remediation actions or security actions with respect to entities, endpoints, or a combination thereof, as described herein. Policy component 618 may further be configured to perform other functions including checking entity compliance status, checking endpoint compliance status, finding open ports, etc. Policy component 618 may restrict network access of an entity (e.g., of an account, a network device, cloud resources, etc.), as described herein. The policy component 618 may thus, among other things, invoke automatically restrict network access of one or more entities and one or more entities.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Storage component 620 is operable to store information of entities present on a network (e.g., local, remote, etc.) and to store information associated with the entities (e.g., properties), as described herein, for future access and application of one or more policies.

The system 600 may be software stored on a non-transitory computer readable medium having instructions encoded thereon that, when executed by a processing device, cause the processing device to access information associated with a type of entity to be monitored on a network and scan the network for a plurality of entities. The instructions may further cause the processing device to select one or more entities of the plurality of entities based on the type of entity to be monitored on the network and access one or more properties associated, respectively, with the selected one or more entities of the plurality of entities based on the type of entity to be monitored on the network. The instructions may further cause the processing device to store information associated with the one or more selected entities of the plurality of entities and the one or more properties associated with the selected one or more entities.

In some embodiments, the instructions further cause the processing device to perform an action on an entity of the one or more selected entities of the plurality of entities based on a policy. In various embodiments, the type of entity is independent of at least one of an internet protocol (IP) address or a media access control (MAC) address. In some embodiments, the one or more entities comprises an account. In various embodiments, the one or more entities comprises a cloud based storage resource. In various embodiments, the one or more entities comprises is an indicator of compromise (IOC). In some embodiments, the one or more entities comprises a network device configuration. In various embodiments, the scan of the network for a plurality of entities comprises communication with a plurality of devices. In some embodiments, each of the plurality of devices is operable to have at least one entity matching the type of entity.

Figure 7:
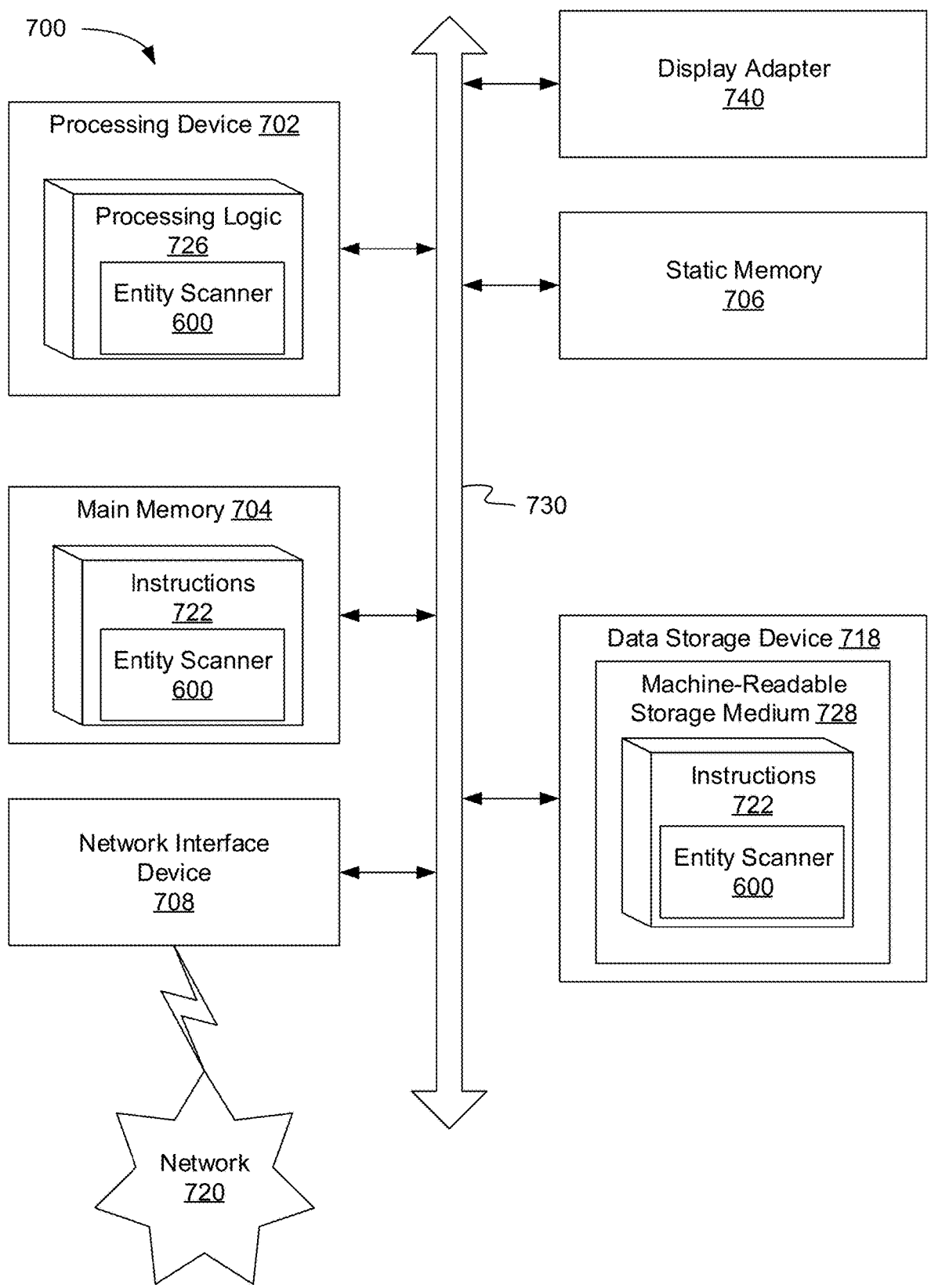
FIG. 7 is a block diagram illustrating an example computer system, in accordance with one implementation of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor device 102 configured to determine one or more entities, determine information associated with the one or more entities, and apply policies.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), a data storage device 718 (e.g., storage component 620 or operable in conjunction therewith), and display adapter 740, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of system 600 shown in FIG. 6, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute entity scanner 600. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for determination of one or more entities, determination of information associated with the one or more entities, and application of policies to the entities, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Display adapter 740 may be a graphics processing unit (GPU) or other visually configured or related output device and be configured for output of video, audio, and other signals to a display device (not shown). In some embodiments, display adapter 740 may be configured for communicatively coupling with a display device and outputting thereto. In various embodiments, display adapter 740 may include a display device. Display adapter 740 may work with display component 614 to render, output, or a combination thereof one or more GUIs (e.g., FIGS. 4-5) and text based interfaces including information associated with one or more entities or policies.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing information associated with a type of entity to be monitored on a network;
   scanning the network for a plurality of entities;
   selecting, by a processing device, one or more entities of the plurality of entities based on the type of entity to be monitored on the network, wherein one of the one or more entities is a new entity;
   accessing one or more properties associated, respectively, with the selected one or more entities, including the new entity, of the plurality of entities based on the type of entity to be monitored on the network;
   accessing information associated with the new entity from another source based on the type of entity to be monitored on the network;
   storing information associated with the one or more selected entities, including the new entity, of the plurality of entities and the one or more properties associated with the selected one or more entities; and
   performing an action on an entity of the one or more selected entities of the plurality of entities based on a policy, wherein the action comprises preventing an account associated with a misconfigured firewall or router from accessing network resources.

2. The method of claim 1, wherein the type of entity is independent of at least one of an interne protocol (IP) address or a media access control (MAC) address.

3. The method of claim 1, wherein the one or more entities comprises an account.

4. The method of claim 1, wherein the one or more entities comprises a cloud based storage resource.

5. The method of claim 1, wherein the one or more entities comprises an indicator of compromise (IOC).

6. The method of claim 1, wherein the one or more entities comprises a network device configuration.

7. The method of claim 1, wherein the scanning of the network for a plurality of entities comprises communication with a plurality of devices, wherein each of the plurality of devices is operable to have at least one entity matching the type of entity.

8. A system comprising:
   a memory; and
   a processing device, operatively coupled to the memory, to:
   access information associated with a type of entity to be monitored on a network;
   scan the network for a plurality of entities;
   select one or more entities of the plurality of entities based on the type of entity to be monitored on the network, wherein one of the one or more entities is a new entity;
   access one or more properties associated, respectively, with the selected one or more entities of the plurality of entities based on the type of entity to be monitored on the network;
   access information associated with the new entity from another source based on the type of entity to be monitored on the network;
   store information associated with the one or more selected entities, including the new entity, of the plurality of entities and the one or more properties associated with the selected one or more entities; and
   perform an action on an entity of the one or more selected entities of the plurality of entities based on a policy, wherein the action comprises a poll for virtualization system information to determine a type of remediation action to take after checking permissions.

9. The system of claim 8, wherein the type of entity is independent of at least one of an interne protocol (IP) address or a media access control (MAC) address.

10. The system of claim 8, wherein the one or more entities comprises an account.

11. The system of claim 8, wherein the one or more entities comprises a cloud based storage resource.

12. The system of claim 8, the one or more entities comprises is an indicator of compromise (IOC).

13. The system of claim 8, wherein the one or more entities comprises a network device configuration.

14. The system of claim 8, wherein the scan of the network for a plurality of entities comprises communication with a plurality of devices.

15. A non-transitory computer readable medium having instructions encoded thereon that, when executed by a processing device, cause the processing device to:
   access information associated with a type of entity to be monitored on a network;
   scan the network for a plurality of entities;
   select, using the processing device, one or more entities of the plurality of entities based on the type of entity to be monitored on the network, wherein one of the one or more entities is a new entity;
   access one or more properties associated, respectively, with the selected one or more entities of the plurality of entities based on the type of entity to be monitored on the network;
   access information associated with the new entity from another source based on the type of entity to be monitored on the network;
   store information associated with the one or more selected entities, including the new entity, of the plurality of entities and the one or more properties associated with the selected one or more entities; and
   perform an action on an entity of the one or more selected entities of the plurality of entities based on a policy, wherein the action comprises a poll for virtualization system information to determine a type of remediation action to take after checking permissions.

16. The non-transitory computer readable medium of claim 15, wherein the type of entity is independent of at least one of an interne protocol (IP) address or a media access control (MAC) address.

17. The non-transitory computer readable medium of claim 15, wherein the one or more entities comprises an account.

* * * * *